United States Patent [19]
van Rossen

[11] Patent Number: 5,505,852
[45] Date of Patent: Apr. 9, 1996

[54] FILTER ELEMENT FOR THE FILTRATION OF FLUIDS

[75] Inventor: Leonard M. van Rossen, Bunnik, Netherlands

[73] Assignee: Minnesota Mining and Manufacturing Company, St. Paul, Minn.

[21] Appl. No.: 256,594

[22] Filed: Jul. 19, 1994

[30] Foreign Application Priority Data

Mar. 4, 1992 [DE] Germany .......................... 42 06 738.3

[51] Int. Cl.⁶ .............................................. B01D 46/00
[52] U.S. Cl. ......................... 210/493.3; 55/500; 55/514; 55/521
[58] Field of Search ........................... 55/497, 500, 514, 55/521; 210/483, 493.3

[56] References Cited

U.S. PATENT DOCUMENTS

| | | | |
|---|---|---|---|
| 3,146,197 | 8/1964 | Getzin | 55/497 |
| 3,506,457 | 4/1970 | Gidlow et al. | 99/141 |
| 3,871,851 | 3/1975 | Neumann | 55/521 |
| 4,512,891 | 4/1985 | Wright et al. | 210/445 |
| 4,537,812 | 8/1985 | Elbers | 55/497 |
| 4,617,122 | 10/1986 | Kruse et al. | 210/493.3 |
| 4,619,676 | 10/1986 | Turck | 55/500 |
| 4,728,426 | 3/1988 | Rudinger et al. | 55/500 |
| 4,799,944 | 1/1989 | Dixon et al. | 55/500 |
| 4,954,255 | 9/1990 | Muller | 210/437 |
| 5,051,118 | 9/1991 | Andreae | 55/97 |
| 5,071,555 | 12/1991 | Enbom | 210/493.5 |
| 5,114,448 | 5/1992 | Bartilson | 55/497 |

FOREIGN PATENT DOCUMENTS

| | | | |
|---|---|---|---|
| 0398459 | 5/1990 | European Pat. Off. | |
| 0383236B1 | 12/1992 | European Pat. Off. | |
| 668252 | 10/1929 | France | 55/497 |
| 3110733 | 11/1982 | Germany | 55/497 |
| 8318714.6U1 | 6/1983 | Germany | |
| 8901798.6U1 | 2/1989 | Germany | |
| 4004343 | 8/1991 | Germany | |
| 676800 | 3/1991 | Switzerland | 55/497 |

Primary Examiner—C. Scott Bushey
Attorney, Agent, or Firm—Gary L. Griswold; Walter N. Kirn; William J. Bond

[57] ABSTRACT

The filter element (10) includes a filter material layer (12) being held and supported by a support material layer (14). The support material layer (14) can be folded in zig-zag manner and has bending regions (16, 17) with folding portions (18) therebetween. The support material layer (14) has the region of its folding portions (18) provided with deformations (20) projecting from the planes of the folding portions (18). The filter material layer (12) is supported by the support material layer (14) through the boundary edges of the deformations (20).

9 Claims, 5 Drawing Sheets

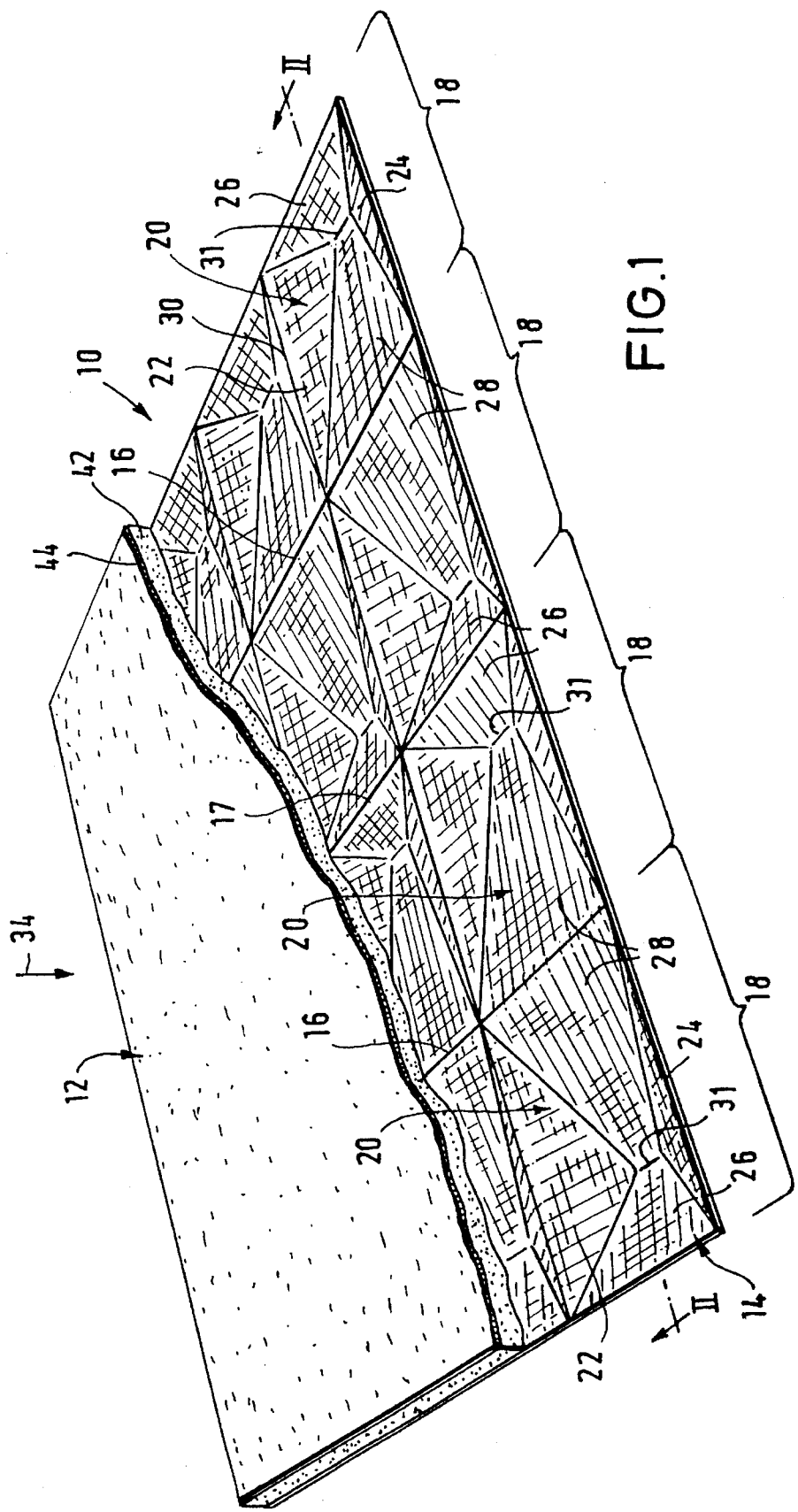

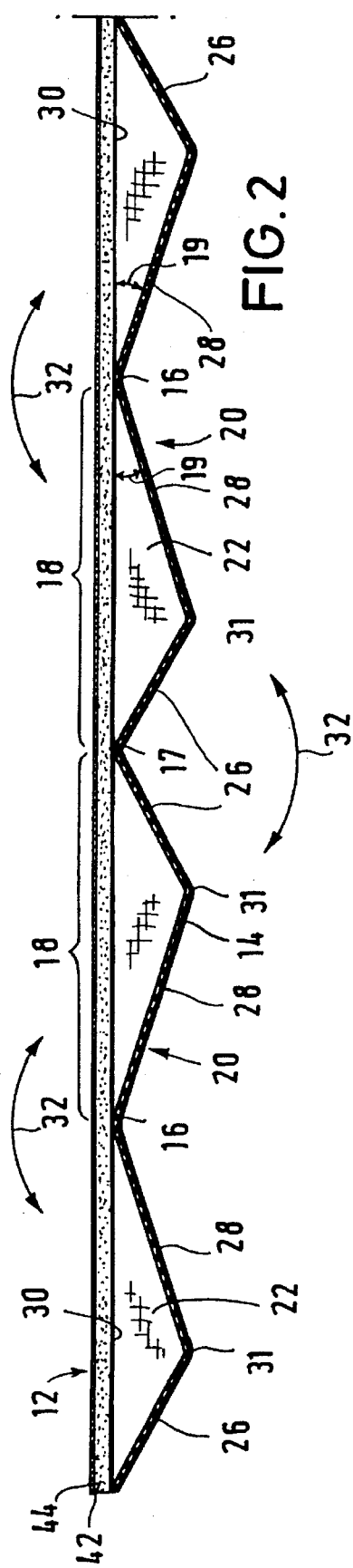
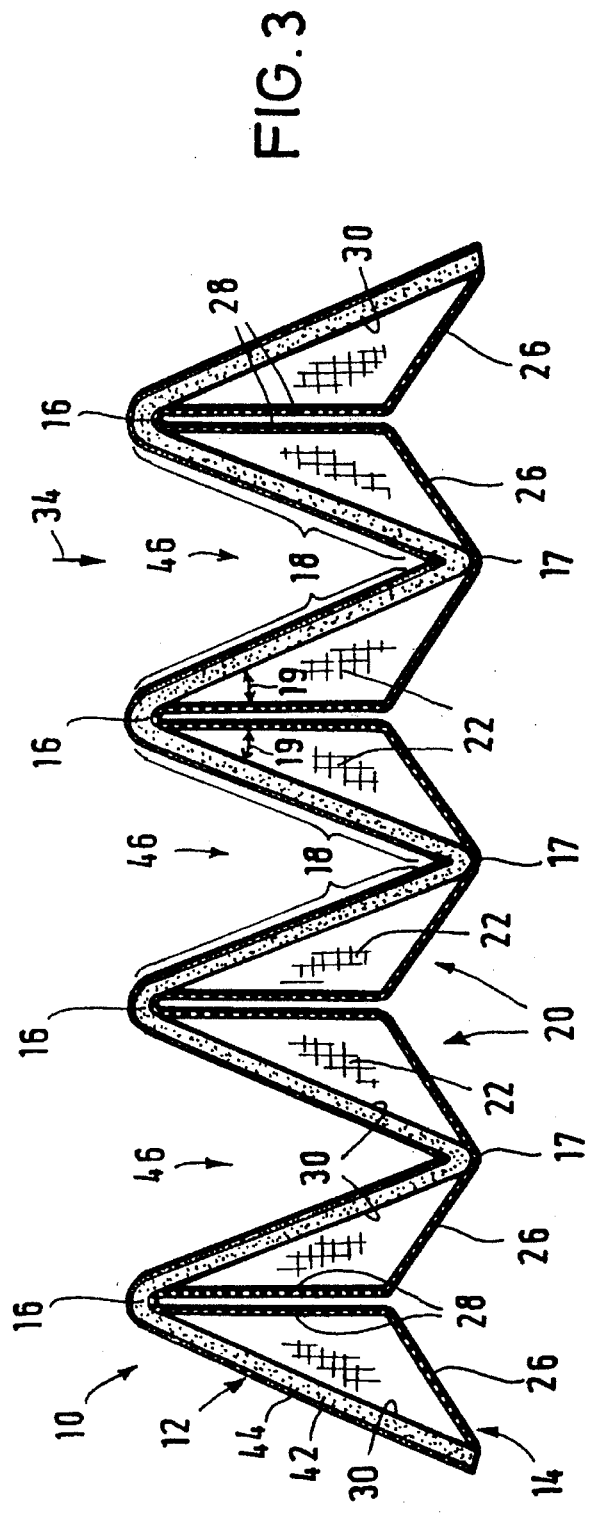

5,505,852

FILTER ELEMENT FOR THE FILTRATION OF FLUIDS

FIELD OF THE INVENTION

The invention is directed to a filter element for the filtration of fluids, particularly for the filtration of air.

BACKGROUND OF THE INVENTION

Fluid or air filtering means are known in a wide variety of embodiments. Known filtering means comprise a frame or the like holding a filter element. The filter element is provided with a layer of filter material for filtration of the fluid or the air, i.e. for retaining the impurities conveyed in the fluid or the air stream which have to be filtered out. The materials for the filter material layer are nonwoven fiber layers, preferably electret materials, foamed plastics or other materials being permeable to the fluid or air to be cleaned. Often, the filter material layer also consists of paper. For enlarging the surface of the filter material layer, the filter material layer is folded to present a zig-zag shape when seen in cross section. If the material of the filter layer has no inherent shape stability, as is the case, e.g., with nonwoven materials, a support material layer for supporting the filter material layer is required in addition to the filter material layer itself. The support material layer, being a reticular support structure of metal or plastic, is permeable to the fluid or air and is connected to the filter material layer, e.g., by bonding. A decisive value for all fluid filter elements is the flow resistance caused by these filter elements in the flow to be cleaned.

Besides providing zig-zag shaped layers of support material, the state of the art offers many suggestions for mechanical stabilization the zig-zag shape of the filter material layer. In the filter elements according to DE 89 01 798.6 U1 and EP-A-0 383 236, the support material layer is of sufficient stability for preventing a widening and folding effect (ballooning and collapsing) of the individual folding portions of the zig-zag like folded filtering and support material layers. U.S. Pat. No. 3,506,457 teaches the connection of the zig-zag shaped filter material layer to a flat reticular support structure; in this prior art solution, the zig-zag shaped filter material layer is connected to the flat reticular support structure along each second bending line. Spacers arranged on the filter frame for providing and maintaining the zig-zag shape of the filter material layer are known, e.g., from EP-A-0 170 643. In other known filtering means, the filter frame has lateral webs or the like extending thereacross, with the filter material layer arranged in zig-zag shape between said webs. Adjacent each web edge, there is arranged a bending line or a bending region of the filter material layer. In most of these filter means, the filter frames are arranged in two parts and thus have to be attached to each other so that assembly of the filter means is unfavorably complicated. Spacers distributed over the whole width of the filter are known from the filter means according to DE 83 18 714.6 U1 and WO 84/03842. DE 21 38 412 C3 teaches a zig-zag-shaped filter paper having wedge-shaped spacers arranged between the folds for providing stability on the one hand and the required mutual distance between the individual folding portions on the other hand. According to EP-A-0 377 419, the filter paper is provided, in the region of the bending lines, with lines or drops of adhesive material serving for connection of the folding portions on the one hand and for maintaining the distance between them on the other hand. Finally, in the filter means known from U.S. Pat. No. 4,512,891 and EP-A-0 398 459, the filter material layers have spacers integrally formed thereon. Thus, the spacers of these filter elements are provided in one piece with the filter material layer.

It is an object of the invention to provide a filter element for the filtration of fluids, particularly for the filtration of air which, although a layer of support material is provided, has only a small flow resistance and whose zig-zag shape is kept stable to a large extent.

For solving the above object, there is provided in accordance with the invention a filter element for the filtration of fluids, particularly for the filtration of air, having a filter material layer for filtration of the fluid and a fluid-permeable support material layer for supporting the filter material layer, wherein the support material layer is folded in zig-zag shape and comprises individual folding portions arranged in pairs at mutual angles, with bending lines or bending portions formed between the folding portions, and wherein the support material layer, for stabilizing its zig-zag shape, has its folding portions provided with a plurality of deformations projecting from the planes of the folding portions and being arranged in such a manner that the support material layer in its folding portions supports the filter material layer through the boundary edges or rims of the deformations.

For providing the zig-zag shape of the filter material layer, the filter element of the invention includes a suitably formed layer of support material. This support material layer can be, e.g., a mesh-like reticular support structure of plastic material or of plastic-reinforced support tissue. The reticular support structure or the support tissue must be highly fluid and air permeable to avoid negatively effecting the filter element air resistance. Therefore, it is advantageous if the reticular support structure or the support tissue is relatively wide-meshed and its webs are relatively thin. Such a reticular support structure, although folded in zig-zag shape, has low shape stability. For increasing the mechanical stability and bending rigidity of the zig-zag shapes of the reticular support structure or the support tissue, a plurality of deformations are pressed into the support material layer of the filter element of the invention; in this manner, the support material has a three-dimensional structure already before it is folded into its zig-zag shape. Depending on the viewpoint, the deformations of the support material layer appear as depressions or protrusions formed therein. These deformations are restricted to the regions of the folding portions; the depressions or protrusions, in their regions facing the bending lines where the folding portions lie comparatively close to each other, are flat enough such that the reticular support structure or tissue can be easily folded into the zig-zag form at a predetermined relatively acute angle between two successive folding portions.

The deformations protruding from the planes defined by the folding portions provide extremely high stability of shape to the reticular support structure or the support material layer so that the reticular support structure can have relatively wide meshes and thin webs. Further, the deformations of the reticular support structure have a favorable effect on the flow characteristics of the filter element of the above configuration. Since the filter material layer spans the deformations, it does not abut the reticular support structure in the region of the deformations; instead, the reticular support structure supports the filter material layer only on the boundary regions of the deformations and the regions between the deformations if they are a comparatively large distance from each other. Depending on the shape and the size of the deformations, it can be advantageous if preferably line-shaped projections are provided within the deformations, said projections being arranged in the same plane as the boundary edges and in the still unfolded condition of the support material layer in the same plane as the bending lines or portions. In this case, the filter material layer is supported in a linear or substantially linear fashion, at a plurality of locations without impairing the bending rigidity of the support material layer. Accordingly, during air flow through the filter element, the filter material layer can freely expand in the region of the deformations of the reticular support structure so that the air resistance does not increase due to increased density of the filter material layer due to the fluid flow. As compared to a filter element whose filter material layer is pressed by the onflow of fluid into face-to-face abutment against a support material layer arranged thereunder, the filter element of the invention is distinguished in that the pressure drop caused by the filter element is smaller. Thus, the favorable flow characteristics of the filter element of the invention result, on the one hand, from the (in the preferred case) only thin-lined support of the filter material layer by the support material layer and, on the other hand, from the fact that the support material layer, due to the deformations (depressions or protrusions in the flow direction), can be considerably thinner in the folding portions and thus be much more permeable to the fluid to be filtered.

In a preferred embodiment of the invention, it is provided that the deformations of the support material layer are arranged in such close proximity to each other that the support material layer supports the filter material layer in the folding portions between the boundary edges of the deformations exclusively via a structure of line-shaped contacting regions between the boundary edges of the deformations and that the other regions of the folding portions of the support material layer, i.e., its deformation regions, are arranged at a distance from the filter material layer. Along the line-shaped contacting regions and the bending lines of the support material layer, the support material layer is connected to the filter material layer, preferably by ultrasonic welding. Another possibility of providing this connection consists in adhesively bonding the filter and support material layers to each other.

Due to the merely localized support of the filter material layer by the support material layer, a major portion of the filter material layer cannot be compressed against the support layer by the onflow of fluid to be cleaned to the extent as would be the case with full-faced abutment of the filter material on the support material layer. Compression of the filter material involves an increased pressure drop. However, in the filter element of the invention, this compression caused increase in pressure drop has no noteworthy effect and thus is negligible.

Preferably, the deformations of each folding portion reach over the complete length thereof, i.e. over the distance between the two bending lines delimiting the folding portion. A plurality of such deformations are located side to side, i.e., transversely to the flow direction. Preferably, the deformations of two adjacent folding portions are arranged symmetrically to the bending line extending between the two folding portions. The shape of the deformations are preferably asymmetrical with the deformations being flatter in the region of the upstream bending lines than in the region of the downstream bending lines so as not to impair the zig-zag folding configuration.

Further preferred, the deformations of the two adjacent folding portions are arranged symmetrically to the respective intermediate upstream bending line and a plurality of such deformations of identical shape are arranged side by side to each other, such that a zig-zag arrangement of the support material layer, or the reticular support structure, provides abutting support material layer folding portions like hollow cones, which contributes decisively to shape stability. The tips of the cones are located on the upstream bending lines.

Preferably, each deformation is provided by four flat surface portions of the support material layer or the reticular support structure extending at angles to each other. This type of deformation is generated, as each other deformation as well, by hot forming or hot pressing of the previously flat support material layer. Depending on the type of the plastic used for the reticular support structure or the support material layer, there still occurs (with duromer plastic material) a hardening of the deformed support material. Preferably, two of the four surface portions of each deformation, respectively, are arranged in pairs facing each other, the two surface portions of the first pair being substantially of triangular shape and the two surface portions of the second pair being substantially of trapezoidal shape. If the triangles of the first pair of surface portions are not equalsided, asymmetric depressions or protrusions are formed.

The filter element of the invention is placed in the fluid flow to be filtered in such a manner that the fluid impinges first on the layer of filter material held by the support material layer. For maintaining the fluid flow, a means such as a blower or the like is provided for blowing air through the filter element. The term "means" has a very wide meaning in the context of the invention; it is meant to comprise all devices and circumstances providing for a (fluid) flow passing through the filter element. Ultimately, in a vehicle provided with the filter element of the invention, such a means can also be the vehicle itself because the vehicle generates an airflow while being driven, with the airflow streaming through the filter element of the filter means. However, also an air filtration system wherein the air flow through the filter element is generated by a pressure difference caused, e.g., by differently heated half spaces on the entrance and exit sides of the filter element, is a means for maintaining the fluid flow.

An embodiment of the filter element of the invention will be explained in greater detail hereunder with reference to the drawings.

BRIEF DESCRIPTION OF THE DRAWINGS

FIG. 1. is a perspective plan view of the reticular support structure used as a support material layer, showing the side thereof with the filter material layer thereon, the depressions formed in the reticular support structure, and the filter material layer which is partially broken away in the Figure.

FIG. 2. is a sectional view, taken along the line III, through the three-dimensional reticular support structure according to FIG. 1 with the filter material layer placed thereon.

FIG. 3. is a side view of the reticular support structure with the filter material layer when folded into zig-zag shape.

DETAILED DESCRIPTION OF THE INVENTION

Figure 4:
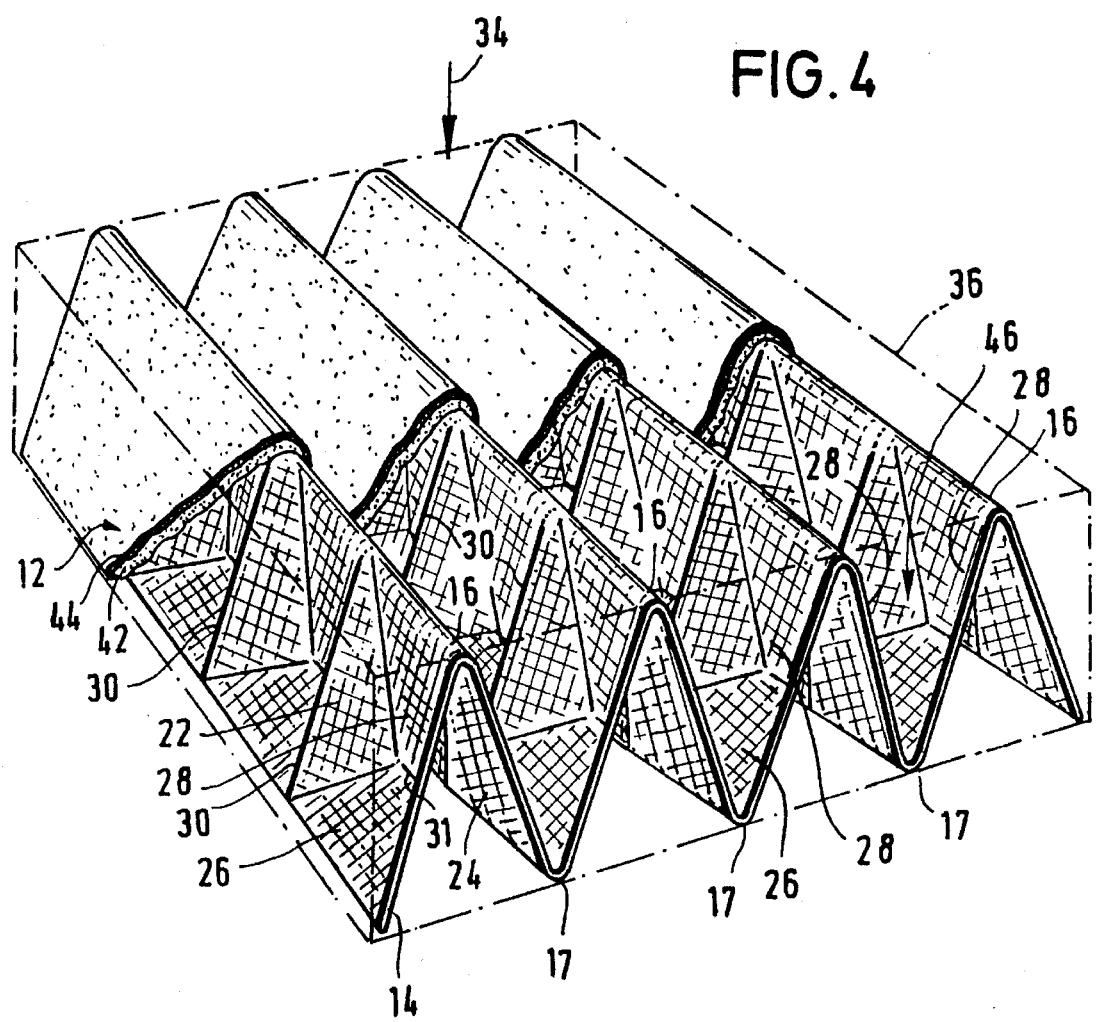
FIG. 4. is a perspective view of the zig-zag shaped filter element, the filter frame surrounding it being schematically indicated.

FIG. 1 shows the stretched out filter element 10 in perspective view from above, i.e. from the side exposed to the onflowing air, with the filter material layer 12 being partly broken away for showing the reticular support structure 14 arranged thereunder. The reticular support structure 14 is made from plastic and serves as a support material layer for the filter material layer 12. The filter material layer 12 is a layer of nonwoven fiber material, particularly a nonwoven electret layer. The reticular support structure 14 has a plurality of bending lines 16,17 extending in parallel and at identical distances to each other while delimiting folding portions 18 therebetween. When the reticular support structure 14 is arranged in zig-zag shape, each of these folding portions 18 is oriented obliquely.

The reticular support structure 14 comprises a plurality of deformations 20 arranged respectively between two adjacent bending lines 16,17. When viewed from the upper face of reticular support structure 14 provided with filter material layer 12, said deformations 20 present protrusions or projections. The deformations 20 extend respectively over the entire folding portions 18, namely in the running direction of the folding portions 18 between two bending lines 16,17. Thus, the bending lines 16,17 define boundary edges at two sides of the deformations 20. The deformations 20 themselves comprise four flat surface portions arranged at angular relationship to each other. Among these surface portions, two triangular portions 22,24 and two trapezoidal portions 26,28 are arranged opposite each other, respectively. Per folding portion 18, a plurality of such deformations 20 are arranged side by side to each other, the base edges of the triangular surface portions 22,24 forming boundary edges 30 for the deformations 20 arranged perpendicularly to the bending lines 16, 17. In the stretched state of the reticular support structure 14, boundary edges 30 and bending lines 16,17 are located on the same plane, with the bending lines 16,17 respectively forming the boundary edges for the trapezoidal surface portions. The trapezoidal surface portions 28 are oriented at a flatter angle relative to the plane of the boundary edges 30 and bending lines 16,17 than the other ones of the trapezoidal surface portions 26. The longer edges of the trapezoidal surface portions 26,28 coincide with the bending lines 16 or 17, respectively. The location and the shapes of the deformations 20 on two adjacent folding portions 18 are symmetrical about the bending line 16 or 17 separating the two folding portions 18. The shorter ones of the parallel edges of the two trapezoidal surface portions 26,28 of each deformation 20 coincide with each other (see line 31 in FIG. 1) and are of identical length. As indicated by arrows 32 in FIG. 2, the reticular support structure 14 can form a zig-zag shape with the two flat trapezoidal surface portions 28, of two opposing deformations 20 on two adjacent folding portions 18, limiting movement at a common bending line 16 which, with respect to the zig-zag shaped filter element 10, is arranged up-stream in flow direction 34. The angle between two adjacent folding portions 18 on both sides of the common bending line 16 is defined by the angle 19 between surface portion 28 and the plane of folding portion 18 which is defined by the boundary edges 30 (cf. FIG. 3). Thus, two adjacent folding portions 18, separated from each other by a bending line 16, extend at an angle to each other being twice as large as angle 19. If the folding portions 18 are arranged at this angle (2×19), the surface portions 28, depending on the respective configuration of the bending region therebetween, extend in parallel to each other or contact each other. In this manner, angle 19 between surface portions 28 and boundary edges 30 determines the extent or periodicity of the folding configuration of reticular support structure 14. On the other hand, the steeper trapezoidal surface portions 26 extend outward on both sides of the downstream, in flow direction 34, bending lines 17 of the folded filter element 10.

Figure 5:
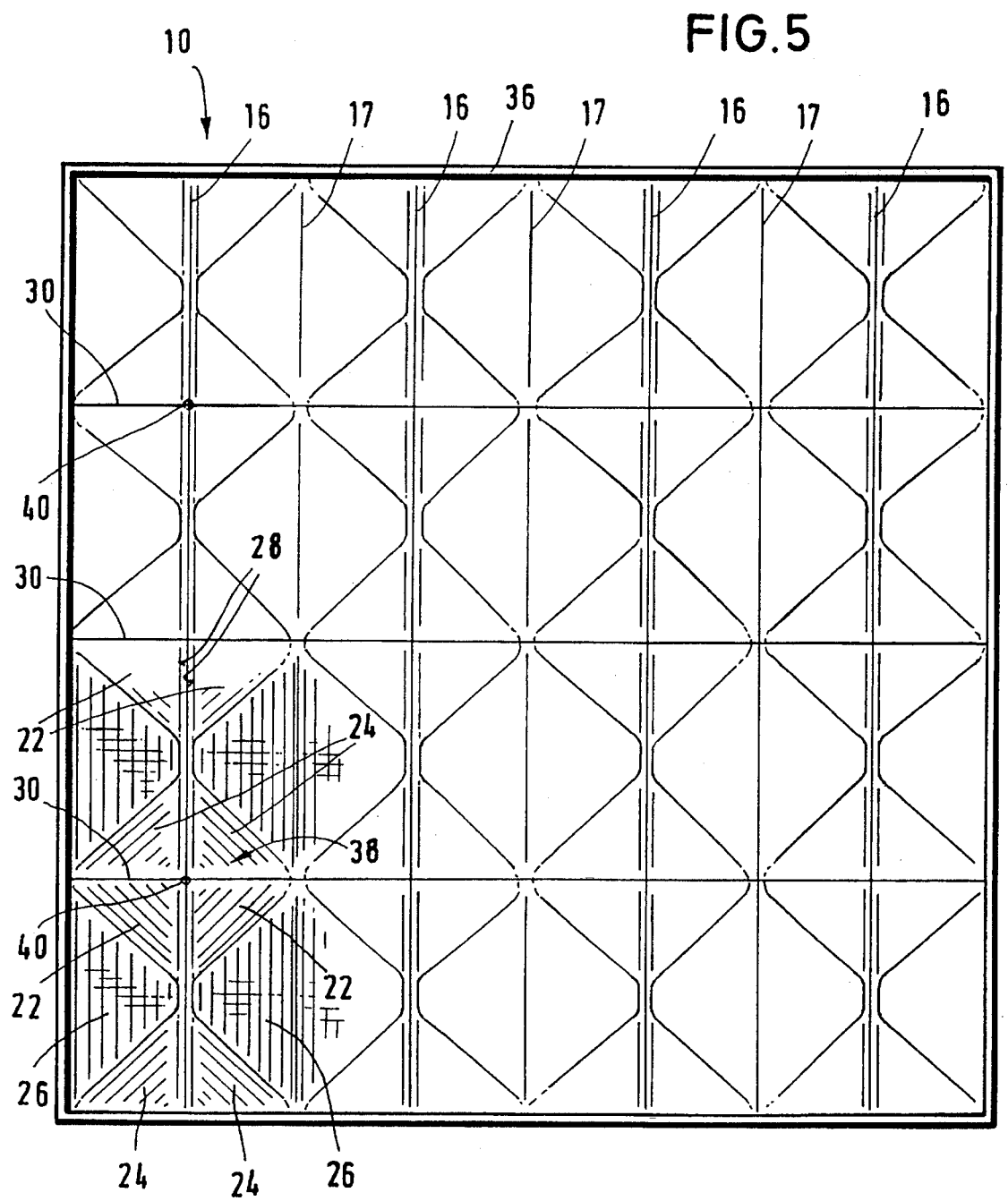
FIG. 5. is a plan view of the zig-zag shaped reticular support structure (without the filter material layer).
Figure 6:
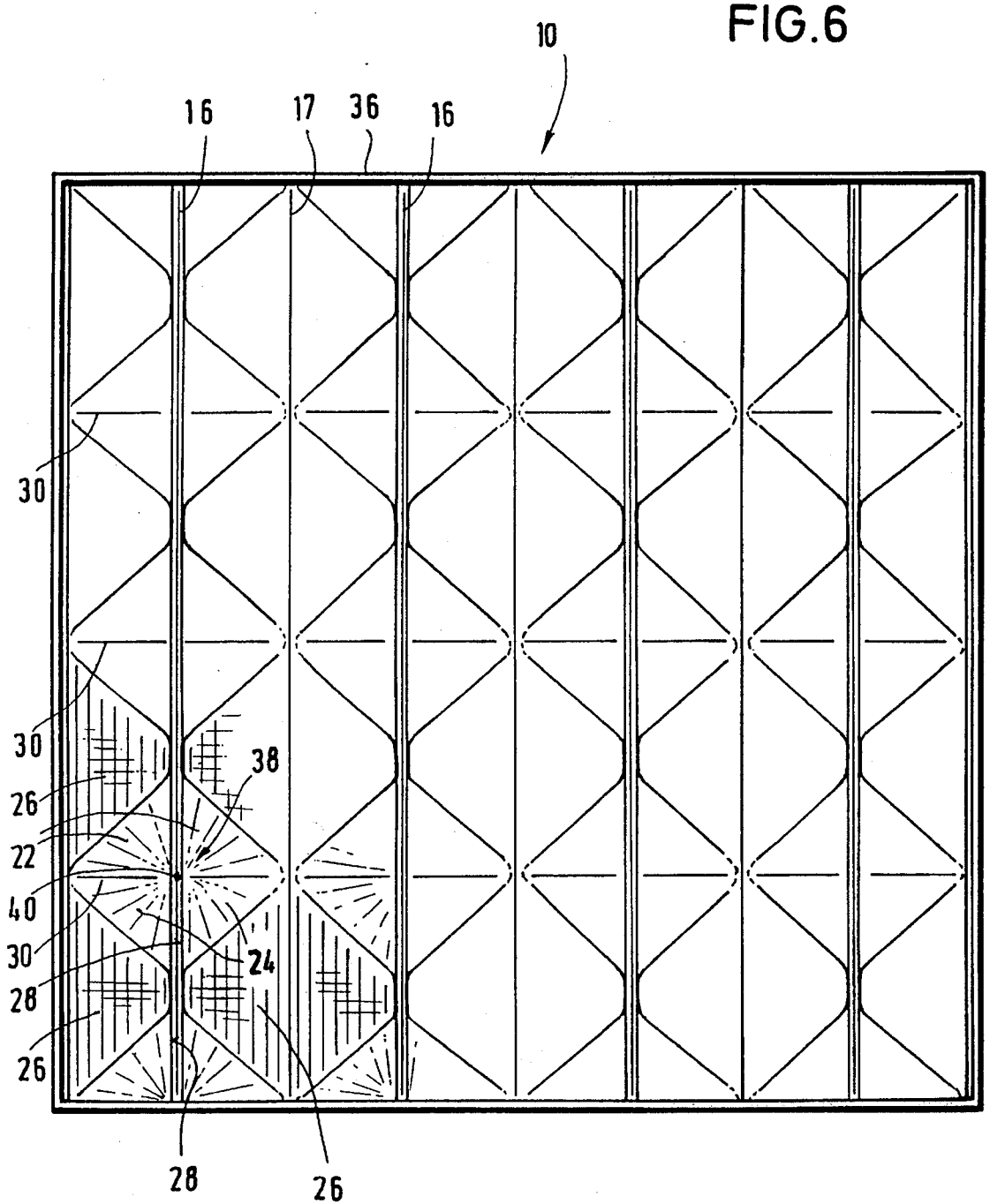
FIG. 6. is a bottom view of the zig-zag shaped reticular support structure.

As can be seen in FIG. 4, the zig-zag shaped filter element 10 is carried by a filter frame 36, connected to the inner face thereof by bonding. As evident from the plan view of FIG. 5 of the folded reticular support structure 14 in the flow direction (the filter material layer 12 being omitted in FIG. 5) and from the bottom view of FIG. 6 of the folded filter element 10 from the underside of the reticular support structure 14, four triangular surface portions 22,24, abut each other in pairs, from four deformations 20 the pairs are arranged adjacent and opposite each other and symmetrical to a bending line 16, and form conical or slightly flattened conical structures 38 when the filter element 10 is folded into zig-zag shape. The tips 40 of said conical structures 38 are located on bending line 16. The reticular support structure 14, when folded into a zig-zag shape, is given a high stability of shape for maintaining the zig-zag configuration by these conical structures 38. The reticular support structure 14 can be rather wide-meshed, while the webs of support structure 14 are relatively thin, which is made possible because the reticular support structure 14, in its zig-zag configuration, has inherent shape stability due to the particular shape of the deformations 20.

As will become evident especially from FIG. 1, the filter material layer 12 lies on the reticular support structure 14 only at the boundary edges 30 and the bending lines 16,17 delimiting the deformations 20. Thus, in the region of the deformations 20, filter material layer 12 is spaced from the reticular support structure 14, arranged thereunder in flow direction 34. The air passing through filter material layer 12 will expand this filter layer 12 of nonwoven fiber material, or at least it will not lead to a compression of the filter material at those locations where filter material layer 12 does not lie on reticular support structure 14; thus, filter material layer 12 becomes more permeable to air or at least substantially maintains its degree of air permeability. With expansion of the nonwoven fiber material of filter material layer 12, the distance of the individual fibers to each other is enlarged. Increased, or at least not notably decreased, air permeability of filter material layer 12 resultant from said expansion causes a reduced pressure drop during use of filter element 10. The pressure drop is also low as the reticular support structure 14, presenting an obstacle to the air flow, can have relatively wide meshes and low air resistance due to its stable three-dimensional shape provided by the deformations 20.

As mentioned before in connection with FIGS. 1 and 3, the filter material layer 12 comprises the nonwoven fiber layer 42 and a cover layer 44 of hardened nonwoven fiber material. The thin cover layer 44 lies on the nonwoven fiber layer 42 on the side of layer 42 opposite the reticular support structure 14 and is bonded to nonwoven fiber layer 42. The cover layer 44 of hardened nonwoven fiber material reduces the number of fiber ends, nonwoven fiber layer 42, projecting into the V-shaped intermediate spaces 46 (cf. FIG. 3) of filter element 10 and causing air turbulence therein.

The following specifications will give an example of a filter element 10 according to the above description and the arrangement shown in the Figures. As a filter element, there was used a reticular support structure of polypropylene having diamant-shaped openings and webs 0.45 mm wide. The diamant-shaped openings had the dimensions 3.6 mm×4.1 mm. The reticular support structure had a thickness of 0.85 mm. Although polypropylene is a preferred material for the reticular support structure, other polymers can be used to that purpose. The flat reticular support structure was subjected to high temperature and deformation to generate or pre-define the deformations 20 with their boundary edges 30 as well as the subsequent bending lines 16,17. The bending lines 16,17 were about 4.5 cm from each other, while the perpendicularly oriented boundary edges 30 between adjacent deformations, were separated by about 4.0 cm. Thus, each deformation covered a surface area of about 4.5 cm×4.0 cm.

The nonwoven fiber material of the filter material layer was a nonwoven electret fiber material of split fibers having a cross-section of 10 micrometers×20 to 60 micrometers. The basic weight of the nonwoven electret fiber material was 100 g/m$^2$. The fibers were randomly distributed and needle-tacked. Further, the fibers consisted of polypropylene with electret characteristics lent to these fibers in a known manner. Connection of the filter material layer to the reticular support structure was accomplished by gluing or ultrasonic welding. A filter material of this type is available under the product name 3M Filtrete™.

An alternative filter material is the material distributed under the product name SBMF, which is a nonwoven fiber material obtained in a melt-blown process and having fibers of round section and a diameter of 1 to 5 micrometers, the fibers being blown onto a substrate.

The sample of the filter element had dimensions (length, width, height) of 145 mm×145 mm×45 mm. The height of the folds was 35 mm; also the distance of the individual folds from each other, i.e., the distance of all upstream and downstream bending lines, was about 35 mm.

The air throughput of a filter element with the above specifications was 75 to 90 m$^3$/h with a pressure drop of 25 pa. The reduction of the air resistance resulting from the novel construction of the filter element is in the range of 15% leading to a higher output rate of clean air, which could be detected, e.g., through the AHAM test.

I claim:

1. A filter element for the filtration of fluids, comprising:
   a filter material layer for filtration of the fluid and
   a fluid-permeable support material layer for supporting the filter material layer, wherein
   the support material layer is folded in a zigzag-shape and comprises individual connected folding portions each folding portion having two faces with a first face supporting and attached to the filter material layer and a second face unattached to the filter material layer, each folding portion (18) is delimited by two bending regions said bending regions located between adjacent connected folding portions, and
   the support material layer, for stabilizing its zig-zag shape, has each individual folding portion provided with a plurality of deformations the deformations forming depressions projecting away from the first face to which the filter material layer is attached, where planes of the individual folding portions are arranged so that the support material layer individual folding portions support the filter material layer in a zig zag shape through boundary edges of the deformations and where the deformations provide mechanical stability and bending rigidity and adjacent connected folding portions abut at the folding portion second faces so as to define a predetermined angle between alternating adjacent connected folding portions, by the deformations on adjacent connected folding portions abutting to define the predetermined angle, which angle defines the zig zag shape of the support material layer and the supported filter material layer.

2. The filter element according to claim 1, wherein the deformations of the support material layer are arranged in such close proximity to each other that the support material layer supports the filter material layer within the folding portions exclusively through a structure of thin-lined contacting regions and the other regions of the folding portions are arranged at a distance to the filter material layer.

3. The filter element according to claim 2, wherein the deformations of each folding portion extend over the complete length thereof between the two bending regions delimiting the folding portion and that a plurality of such deformations are arranged side by side to each other.

4. The filter element according to claim 3, wherein the deformations of two adjacent connected folding portions are arranged symmetrically to the bending region extending between the two folding portions.

5. The filter element according to claim 4, wherein the filter material layer is connected to the support material layer along the boundary edges of the deformations.

6. The filter element according to claim 5, wherein the folding density of the support material layer is limited by mutual abutment of the deformations of adjacent folding portions.

7. The filter element according to claim 1, wherein each deformation comprises four flat surface portions extending at angles to each other.

8. The filter element according to claim 7, wherein respectively two pairs of surface portions are arranged opposite each other, the two surface portions of a first pair being of triangular shape and the two surface portions of a second pair being of trapezoidal shape.

9. The filter element according to claim 8, wherein the two trapezoidal surface portions of each deformation are asymmetrical and have different sizes, and that the larger ones of the trapezoidal surface portions of adjacent folding portions, being separated by a bending region forming peaks on a face to which the filter material layer is attached, are arranged symmetrically to this bending region.

* * * * *